United States Patent [19]
McKernan

[11] Patent Number: 5,722,730
[45] Date of Patent: Mar. 3, 1998

[54] REINFORCEMENT MEMBER FOR PIVOTABLE ASSEMBLY

[75] Inventor: Thomas J. McKernan, Grand Rapids, Mich.

[73] Assignee: Excel Industries, Inc., Elkhart, Ind.

[21] Appl. No.: 739,338

[22] Filed: Oct. 29, 1996

[51] Int. Cl.$^6$ .................... A47C 31/00; B60N 2/44
[52] U.S. Cl. .................. 297/463.1; 297/463.2; 297/367; 16/328; 403/92
[58] Field of Search ................ 297/463.1, 463.2, 297/367; 16/328; 403/84, 92, 93

[56] References Cited

U.S. PATENT DOCUMENTS

| | | |
|---|---|---|
| Re. 32,790 | 11/1988 | Strowick et al. |
| 549,599 | 11/1895 | Gilfillan |
| 3,779,655 | 12/1973 | Toyota |
| 4,085,969 | 4/1978 | Nakane et al. |
| 4,087,885 | 5/1978 | Gillentine |
| 4,103,970 | 8/1978 | Homier |
| 4,223,946 | 9/1980 | Kluting |
| 4,294,488 | 10/1981 | Pickles |
| 4,709,965 | 12/1987 | Kazaoka et al. |
| 4,736,986 | 4/1988 | Kato et al. ................ 297/367 |
| 4,738,252 | 4/1988 | Friddle et al. |
| 4,765,680 | 8/1988 | Kawashima ................ 297/367 |
| 4,767,158 | 8/1988 | Satoh ................ 297/367 |
| 4,770,559 | 9/1988 | Yoo |
| 4,875,735 | 10/1989 | Moyer et al. ................ 297/367 |
| 4,890,950 | 1/1990 | Yoo ................ 16/328 |
| 5,104,190 | 4/1992 | Siegrist |
| 5,340,195 | 8/1994 | Notta ................ 297/463.1 |
| 5,346,281 | 9/1994 | Hughes |
| 5,414,897 | 5/1995 | Loewe |
| 5,438,732 | 8/1995 | Engels et al. |

*Primary Examiner*—Milton Nelson, Jr.
*Assistant Examiner*—Anthony D. Barfield
*Attorney, Agent, or Firm*—Banner & Witcoff, Ltd.

[57] ABSTRACT

A reinforcement member for a pivotable assembly is provided, enhancing resistance to deflection of the componentry of the pivotable assembly when subjected to shear loading. The pivotable assembly is expressly suitable for use as a recliner for a motor vehicle seat, an inertia latch, etc or other device where precise alignment of componentry is critical. The pivotable assembly has a support bracket generally including a pair of support brackets for mounting other componentry of the pivoting assembly, a pivoting member pivoting on a pivot attached to the support brackets, and a reinforcement member attached to the pivot. In one preferred embodiment, the reinforcement member has a projection, optionally a unitary semi-pierce projection, which extends into and preferably abuts an opening in one of the support brackets. The edge of the opening acts as a stop, to participate in carrying impact loads and to resist excessive static loading. In another preferred embodiment, one of the support brackets has a projection extending into the plane of the reinforcement member. The edge of the projection presents a generally perpendicular face or contact surface to the reinforcement member and acts as a stop resisting deflection during static loading of the pivoting member.

17 Claims, 7 Drawing Sheets

REINFORCEMENT MEMBER FOR PIVOTABLE ASSEMBLY

FIELD OF THE INVENTION

The present invention generally relates to mechanisms enhancing the load characteristics of a pivoting member, and more particularly to an enhanced design resisting loading in motor vehicle seat recliners and inertia latches.

BACKGROUND

Typical pivotable assemblies, such as seat recliners for adjustment of a seat back relative a seat base, include a pivoting member rotatable about a pivot attached to support brackets at pivot holes. The pivoting member may be an arm having a series of teeth and may be attached to a seat back. In certain designs, a pawl is also rotatably attached to the support brackets and has a series of teeth which releasably engage the teeth of the arm in a locked position. When the arm is attached to a seat back, the seat back itself can be locked in position until the teeth of the pawl disengage the teeth of the arm. Such disengagement is commonly produced by operation of a spring biased rotatable cam. The cam is normally biased by the spring into engagement with the pawl, holding the pawl against the arm. Rotation of the cam allows or forces the pawl teeth out of engagement with the teeth of the arm.

In such precise recliner mechanisms it is important that the pivot points for each part: arm, pawl and cam, be dimensionally stable. When the recliner assembly is subjected to high loads, the pawl will remain engaged with the arm and the pivot will exert significant forces on the support brackets. Such forces tend to plasticly deform and elongate the pivot holes, potentially leading to partial arm/pawl teeth separation, reducing the load capacity. In addition, spatter or dirt can interfere with operation of the mechanism. It would be desirable to enhance the strength of the pivot points, particularly the arm pivot, as typically the highest moments are seen at the arm.

One way to enhance the strength of the arm pivot is to increase the thickness of the support brackets, and/or increase the strength of the material, usually steel, used in the manufacture of the support brackets. However, it is desirable to make seat recliners as light as possible. Increasing the thickness of the support brackets adds weight and cost to the recliner. Increasing the strength of the steel adds cost to the recliner. These problems are especially true where so-called "remote release" recliners are used, in which a release mechanism is positioned closer to the front of a motor vehicle seat, typically requiring longer support brackets.

Another way to enhance the strength of the arm pivot is to weld the pivot to the support brackets. However, welds can splatter and interfere with the componentry of the mechanism. Moreover, the heat generated by the weld can result in distortions in the components, potentially misaligning the teeth.

In view of the foregoing, it is an object of the present invention to provide a reinforcement member for use on a pivotable assembly to reduce deflection of the pivoting assembly when the pivoting assembly is subjected to high loads.

It is an additional object of the present invention to provide a pivotable assembly of enhanced strength that is of low cost and is easy to manufacture.

It is yet another related object of the present invention to provide such a pivotable assembly that is highly reliable in operation and does not interfere with the other componentry of the mechanism. Additional objects of various preferred embodiments will become apparent from the following disclosure.

SUMMARY

In accordance with these and other objects, there is provided a pivotable assembly having support brackets, a pivot mounted between the support brackets at pivot holes, a pivoting member pivotable around the pivot and a reinforcement member rotationally fixed to the pivot and engaging a support bracket. The reinforcement member, also referred to here as a doubler, acts to enhance the strength of the pivoting member and of the pivotable assembly generally and to substantially reduce deflection. Use of a doubler rotationally fixed to the pivot reduces and in many applications eliminates the need to thicken the entire support bracket, or otherwise take steps to enhance its strength. In seats using seat recliners where the pivoting member is an arm attached to a seat back and pivoting on the pivot, a load generated on the seat back produces a moment on the pivot of the arm. To aid in preventing the shear force generated on the support brackets from causing deformation or failure, the doubler contacts one of the support brackets. Thus, the load generated by the moment is spread over not only the pivot on the support bracket, but also the doubler on the support bracket.

In accordance with one aspect, the doubler is attached to the pivot and has a projection, preferably a semi-pierced projection. The semi-pierced projection extends into an opening in the support bracket. The section of the edge of the opening which receives the force during loading acts as a stop. Alternatively, the projection may be on one of the support brackets and may extend into the plane of the doubler. Here the projection preferably forms a surface which is generally perpendicular to the doubler, and acts as the stop as it contacts the doubler.

In accordance with another aspect, the pivotable assembly may be a seat recliner for a motor vehicle. Recliners typically have first and second generally parallel support brackets, a pivot pin extending between the brackets and an arm pivotable about the pivot pin and having teeth at one end. A pawl is pivotable on the support brackets and has teeth which are engageable with the teeth of the arm. A cam is rotatable from a normal, locking position, forcing the pawl into engagement with the arm, to a non-locking position wherein the teeth of the pawl are not engaged with the teeth of the arm, allowing for comfort adjustment. Typically a spring biases the cam into the normally locking position, and a release mechanism such as a release lever can be used to overcome the force of the spring and rotate the cam to the non-locking position. A reinforcement member is provided as described above. Such reinforcement member may be attached to the pivot, contacting one of the support brackets at a stop, and thereby enhancing resistance to deflection when the arm is subjected to shear forces in its rearward position.

In accordance with yet another aspect, an inertia latch is provided with a reinforcement member enhancing the load strength of an arm which is pivotable about the pivot pin over a travel range extending from a forward position to an adjustable rearward position. Preferably the reinforcement member has a semi-pierced projection extending into an opening in a support bracket. Alternatively, the support bracket has a projection which engages the reinforcement member when the arm is at one end of its travel range.

In accordance with a further aspect, a seat is provided with a seat back pivotable relative a seat base, wherein the motion of the seat back is controlled by a recliner, and the recliner has a reinforcement member as discussed above to increase the resistance to deflection when subjected to shear stresses or similar loading produced on the seat back.

From the foregoing disclosure and the following more detailed description of various preferred embodiments it will be apparent to those skilled in the art that the present invention provides a significant advance in the technology and an of pivotable assemblies including seat recliners. Particularly significant in this regard is the potential the invention affords for a low cost design enhancing resistance to forces received at the pivot point. Additional features and advantages of various preferred embodiments will be better understood in view of the detailed description provided below.

Figure 1:
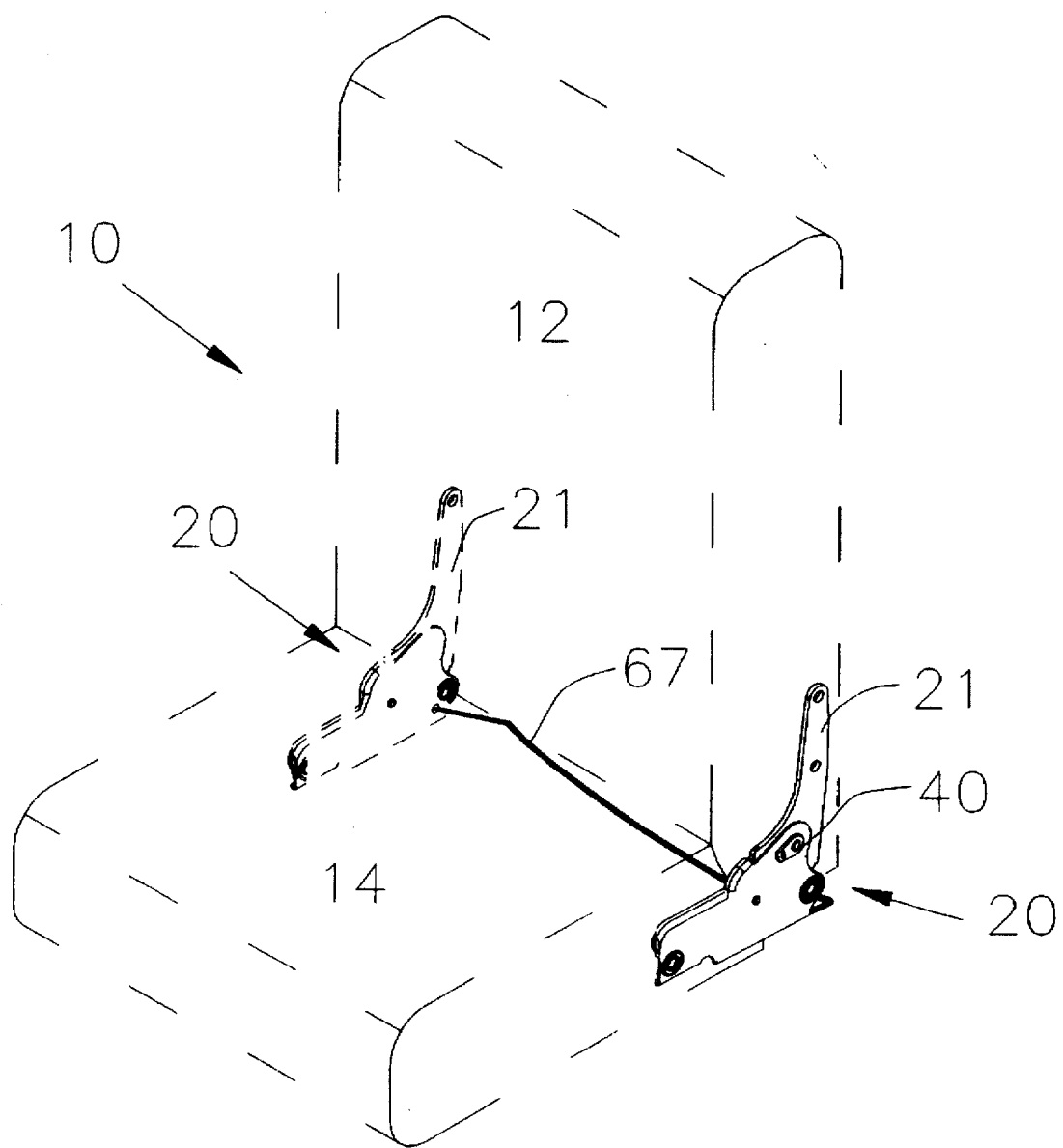
FIG. 1 is an perspective view of a reclinable seat using a reinforcement member in a recliner in accordance with a preferred embodiment.

It should be understood that the appended drawings are not necessarily to scale, presenting a somewhat simplified representation of various preferred features illustrative of the basic principles of the invention. The specific design features of a reinforcement member for a pivoting part as disclosed here, including, for example, the thickness of the reinforcement member and the specific dimensions of the semi-pierced segment of the reinforcement member will be determined in pan by the particular intended application and use environment. Certain features of the illustrated embodiments have been enlarged or distorted relative to others to facilitate visualization and clear understanding. In particular, thin features may be thickened for clarity of illustration. All references to direction and position, unless otherwise indicated, refer to the orientation of the seat recliner assembly device illustrated in the drawings. In general, the forward or rearward direction refers to left and right directions, respectively, in the plane of the paper in the side view of FIG. 2, and up, down or vertical refers to corresponding up, down and vertical directions in the plane of the paper in FIG. 2.

DETAILED DESCRIPTION OF CERTAIN PREFERRED EMBODIMENTS

It will be apparent to those skilled in the art, that is, to those who have knowledge or experience in this area of technology, that many uses and design variations are possible for the reinforcement members disclosed herein. The following detailed discussion of various alternative and preferred features and embodiments will illustrate the general principles of the invention with reference principally to a seat recliner suitable for use in a motor vehicle. A single reinforcement member or doubler is disclosed in the drawings, though it should be understood that more than one doubler may be used on a given pivotable assembly within the scope of this invention. Other embodiments suitable for other applications, including reinforcement members for inertial latches for motor vehicle seats, will be apparent given the benefit of this disclosure.

Referring now to the drawings, FIG. 1 is perspective view of a motor vehicle seat 10 that uses a semi-pierced reinforcement member 40 in accordance with a first preferred embodiment. The seat 10 has a seat back 12 which is pivotable relative a seat base 14. A seat recliner 20 is positioned on at least one side of the seat 10. The seat recliner 20 has support bracket means for supporting the other componentry of the recliner typically comprising first and second support brackets 50, 60 which preferably are two stamped metal plates. The second support bracket 60 may be affixed to the seat base 14, the first support bracket 50 can be affixed to the second support bracket by staked or spun rivets and/or pivots, including arm pivot 22. The pivot 22 typically is a rivet, although it may also be the shank portion of a bolt. Alternatively the support bracket means may have only one support bracket, for example in the case where the side of the seat acts as a mount for the componentry of the recliner.

Figure 2:
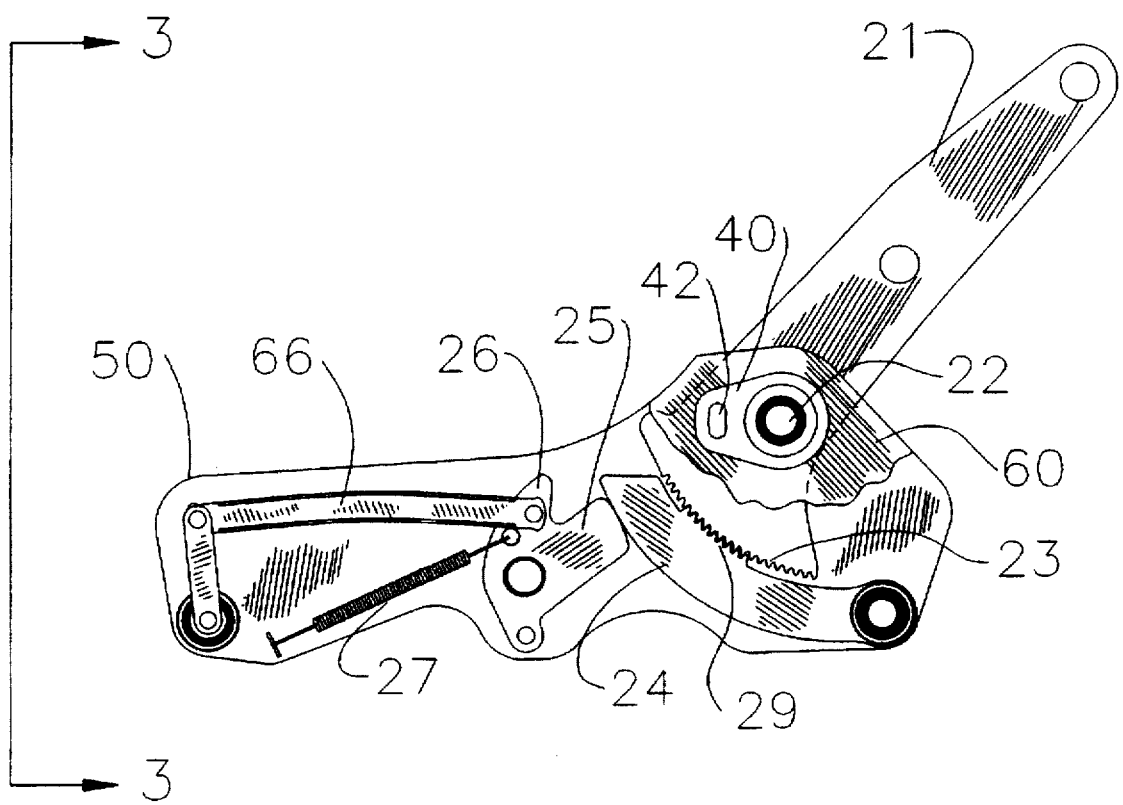
FIG. 2 is a side view of the recliner of FIG. 1, with one of the support brackets partially cut away, showing the doubler, arm, pawl cam, and rod linked to a release lever (not shown)
Figure 3:
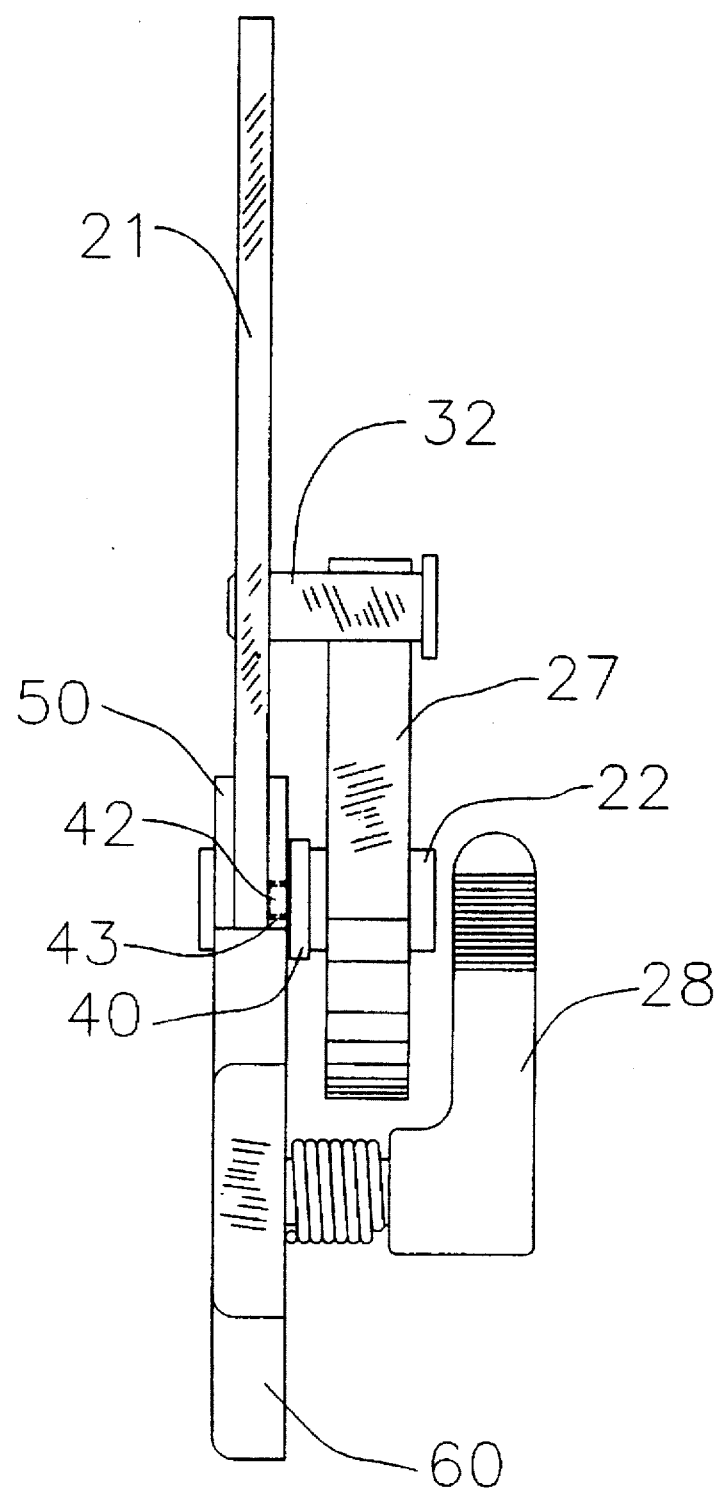
FIG. 3 is a side view of the recliner taken along the line 3—3 in FIG. 2 with an added release lever and a clock spring biasing the arm forward toward a full upright position.

As seen in FIGS. 2–3, an arm 21 is preferably attached to the seat back 12. The arm is pivotable about the pivot 22, and has a series of teeth 23 at one end. This allows the seat back to pivot relative the seat base. The teeth 23 engage teeth 29 on a rotatable or pivotable pawl 24. The pawl pivots about a separate pivot pin and has teeth 29 normally engage the teeth 24 of the arm to lock the arm and the seat back 12 attached to the arm in a locking or latching position. A rotatable cam 25 urges the pawl into the locking position. Cam 25 pivots about a third pivot pin.

Typically a spring 27 biases the cam 25 which in turn biases the pawl into locking engagement with the arm. A release mechanism, such as a release lever 28 connected by a linking rod 66 to the cam, may be employed. The cam may have a positive drive out feature 26 to assist gravity in disengaging the pawl teeth from the arm teeth. As the cam rotates away from the locking position, the positive drive out feature contacts the pawl and urges the pawl out of engagement with the arm. Thus, rotation of the release lever 28 overcomes the force of the spring 27 on the cam 25, pulling the cam out of engagement with the pawl 24, and the pawl disengages the arm 21, allowing for comfort adjustment of the vehicle seat 10.

Optionally, as shown in FIG. 3, a clock spring 31 may be mounted at one end on the pivot 22 and the other end on a rivet 32 or similar projection extending from the arm and placing a biasing force on the rivet 32 urging the arm towards the full forward position when the arm is not locked with the pawl 24.

Figure 4A:
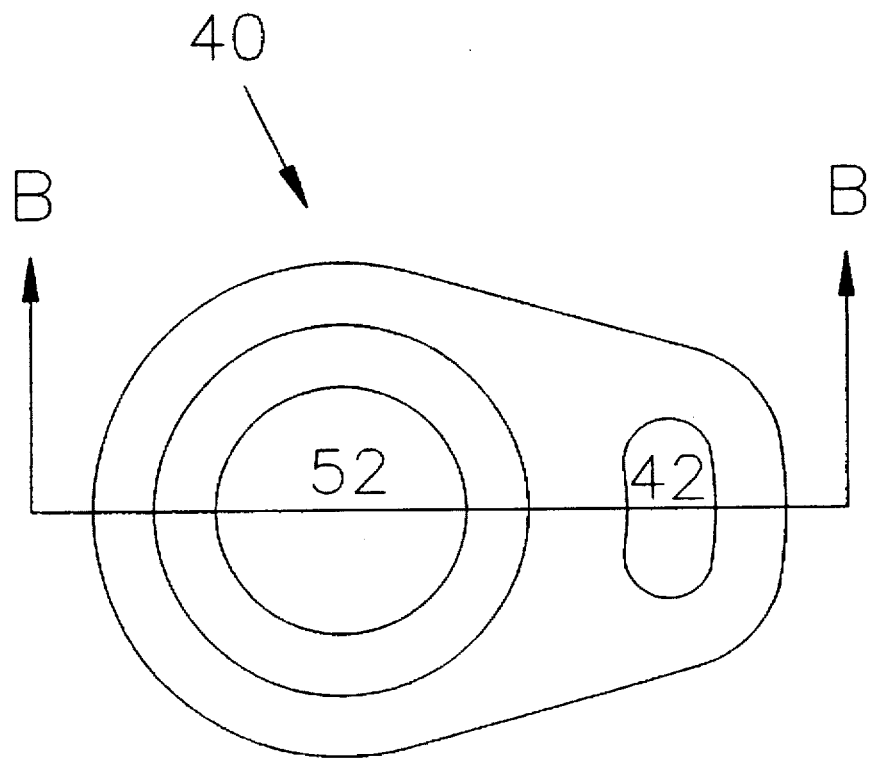
FIG. 4A is an isolated side view of the generally planar doubler showing the semi-pierce projection.
Figure 4B:
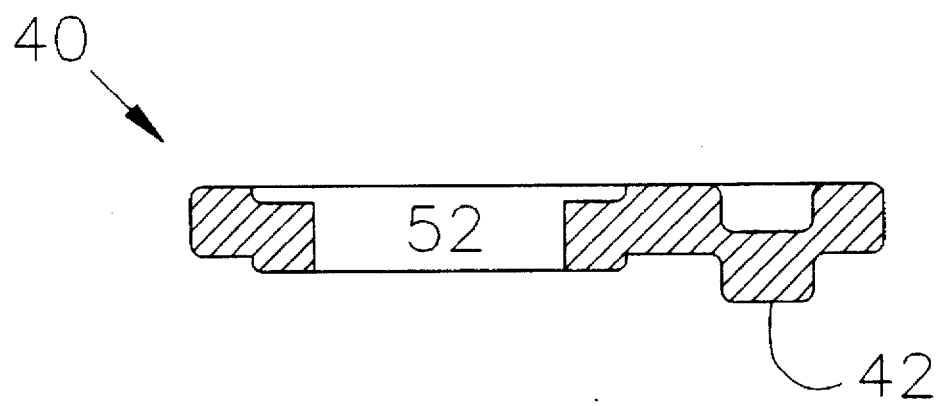
FIG. 4B is a cross sectional view taken along line B—B in FIG. 4A.

To withstand high loads on the seat back which are then transmitted to the recliner without adding addition thickness to the support brackets or welding the pivot to the support brackets, a reinforcement member or doubler 40 is employed. Isolated views of one preferred embodiment of the doubler are shown in FIGS. 4A–4B. The reinforcement member 40 may be mounted externally of the support bracket means, as shown in the drawings, or alternatively, the support bracket means may have a ballooned portion that extends around the reinforcement member. The reinforcement member does not regulate angular motion of the arm beyond reducing deflection of the pivot pin, nor does it move the other componentry of the recliner. Its purpose is to resist loading on the pivot to help prevent deformation of the support brackets 50,60 and misalignment of the arm/pawl teeth 23,29.

In the preferred embodiment shown in FIGS. 2-4, the doubler 40 is seen to be a generally planar member positioned around thread width great is, the doubler has a length and width greater than its depth. Extending into an opening 43 of the support bracket 60 is a projection 42 of the doubler. Preferably the projection 42 is semi-pierced or lanced from the doubler, making it unitary with the doubler. The edge 44 of the opening 43 presents a generally perpendicular surface or stop preferably abutting the projection 42 of the doubler 40. Thus deflection of the components of the recliner is minimized when the recliner is subjected to shear loading. The moment on the pivot is withstood by not only the area that the pivot 22 contacts the support brackets 50, 60, but also by the area that the projection 42 of the reinforcement member 40 contacts the edge 44 of the opening 43 in the support bracket.

Figure 5:
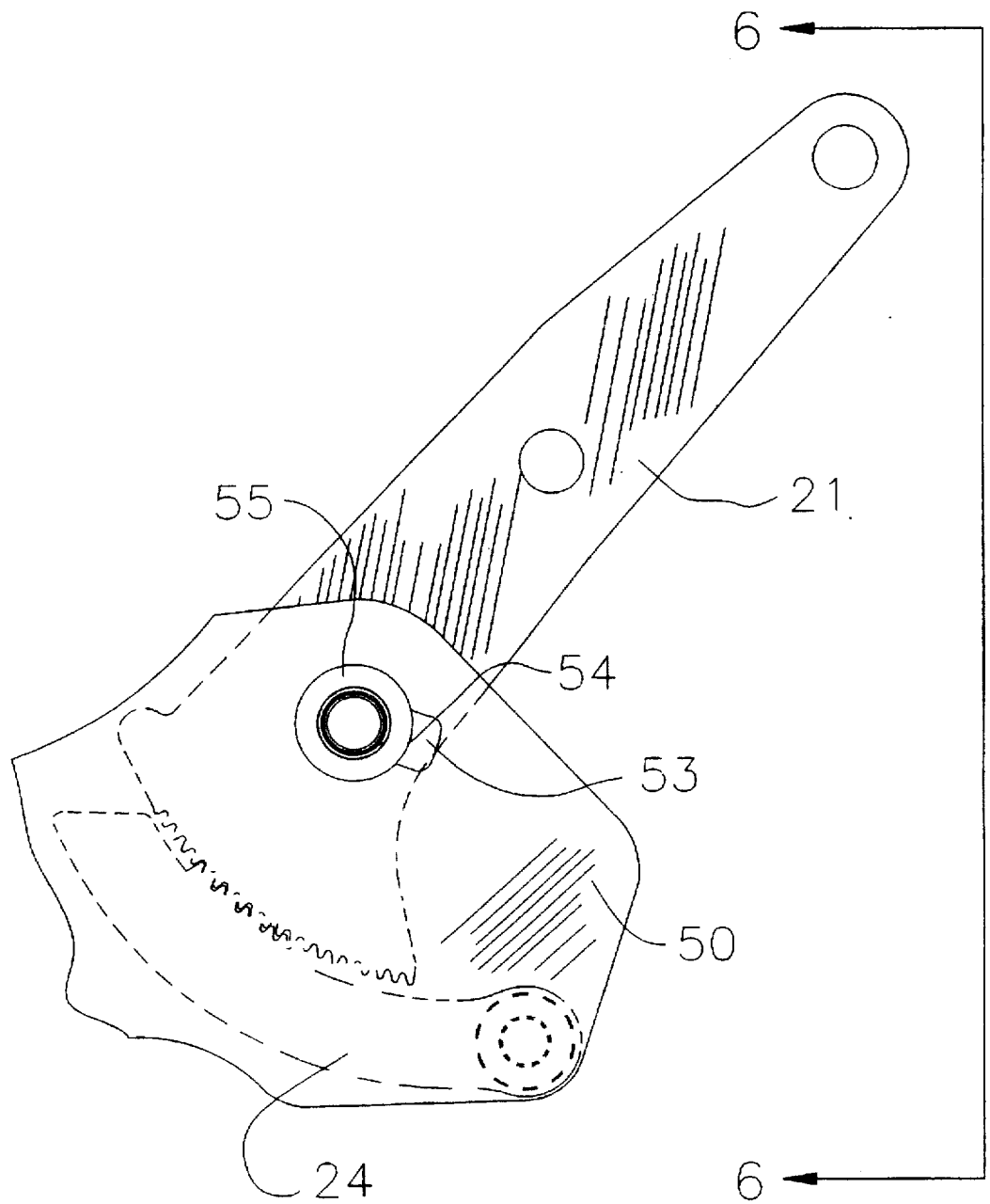
FIG. 5 is an elevation side view of a recliner, partially cut away, revealing an alternative embodiment for a doubler wherein the projection is formed in the support bracket.
Figure 6:
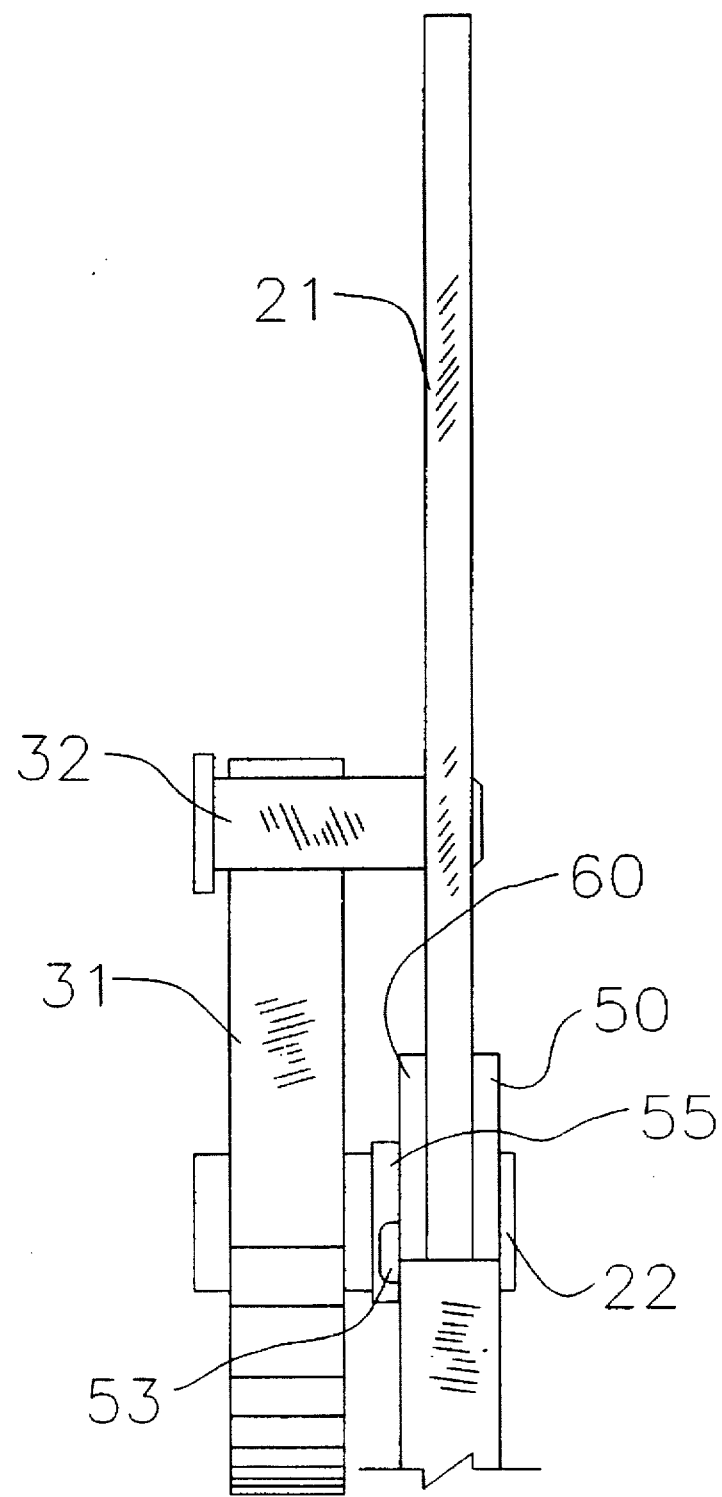
FIG. 6 is a side view of FIG. 5.

FIGS. 5-6 show an alternative embodiment of the reinforcement member 55 for a pivotable assembly. Here, the projection 53, instead of extending from the doubler into the plane of the support brackets, extends from one of the support brackets 60 into the plane of the reinforcement member 55. Preferably the projection is a semi-pierced portion of the support bracket. The edge 54 of the projection again presents a generally perpendicular stop or contact surface preferably abutting the reinforcement member 55. Resistance to deflection caused by loading is again enhanced by increasing the area that receives the load.

Alternative seat recliner designs, such as rotary or "taumel" mechanisms which are known to those skilled in the art, may use reinforcement members to enhance resistance to loading such as those described above.

Figure 7:
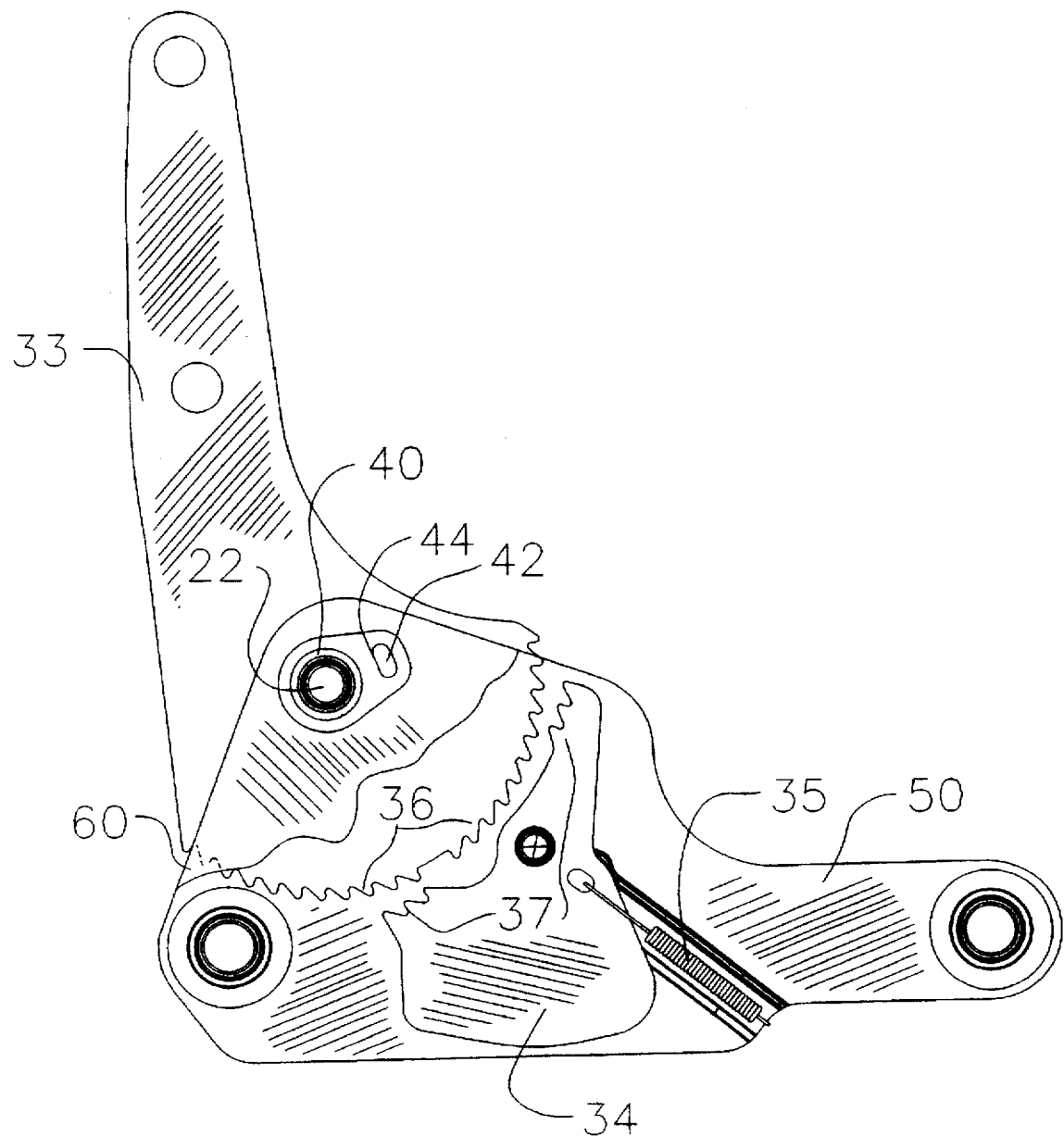
FIG. 7 is a side view of an inertia latch in accordance with an alternative preferred embodiment comprising a recliner with a reinforcement member.

In accordance with an alternative preferred embodiment, FIG. 7 shows a stand alone inertia latch 33 having a load reinforcement member 55 similar to the reinforcement member shown in FIGS. 5-6. The inertia latch 33 can be used in conjunction with a recliner on a motor vehicle seat. The recliner would be mounted on one side of the motor vehicle seat, and the inertia latch may be mounted on the other side. The arm 33 would be mounted to the seat back, and pivotably mounted on support brackets. The support brackets are mounted to the seat base. The inertia latch shown is bi- directional, that is, the pawl 34 and arm 33 have teeth 36,37 which engage one another when the motor vehicle seat is subjected to rapid changes in velocity in either a forward or rearward direction.

As an aid to enhance resistance to load induced deflections while the teeth of the pawl are engaged with the teeth of the arm, a projection 53, preferably semi-pierced, extends from the support bracket 50 into the plane of the reinforcement member 55. The edge 54 of the projection presents a generally perpendicular contact surface or stop preferably abutting the reinforcement member 55, thereby resisting deflection induced by shear forces received by the pivot 22.

From the foregoing disclosure and detailed description of certain preferred embodiments, it will be apparent that various modifications, additions and other alternative embodiments are possible without departing from the true scope and spirit of the invention. For example, pivotable assemblies as disclosed above may be used on seats using a recliner on one side and an inertia latch on the other side, or recliners on both sides, or the recliner and inertia latch mounted together on one side, etc. The embodiments discussed were chosen and described to provide illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A pivoting assembly comprising, in combination:
   support bracket means for mounting other componentry of the pivoting assembly, comprising first and second support brackets, and having a stop formed on at least one of the first and second support brackets;
   a pivot non-adjustably rigidly fixed to the first support bracket;
   a pivoting member, pivotable around the pivot; and
   a reinforcement member fixed non-rotationally to the pivot, wherein the stop of the support bracket means and the reinforcement member are fixed in contact at a location remote from the pivot.

2. The pivoting assembly of claim 1 wherein the reinforcement member has a projection, and the first support bracket has an opening sized to receive the projection, and the stop is an edge of the opening.

3. The pivoting assembly of claim 1 wherein the first support bracket has a projection and the stop is a generally perpendicular surface edge abutting the reinforcement member.

4. A seat recliner for a motor vehicle comprising, in combination:
   first and second support brackets affixable to a motor vehicle;
   a pivot non-adjustably rigidly fixed to the support brackets;
   an arm pivotable about the pivot over a travel range extending from a forward position to an adjustable rearward position and having teeth at one end;
   a pawl pivotable about a second pivot pin from a locking position to a non-locking position, having teeth engageable with the teeth of the arm in the locking position;
   a cam rotatable about a third pivot pin from a locking position to a non-locking position;
   a spring biasing the cam toward the locking position wherein the cam biases the pawl to engage the teeth of the pawl into engagement with the teeth of the arm; and
   a reinforcement member non-rotationally fixed to the pivot and contacting the first support bracket at a stop, located on the first support bracket and at a location remote from the pivot.

5. The seat recliner of claim 4 wherein the reinforcement member has a projection, and the first support bracket has an opening sized to receive the projection, and the stop is the edge of the opening against which the projection exerts force as the pivot is subjected to loading.

6. The seat recliner of claim 5 wherein the projection is semi- pierced from the reinforcement member.

7. The seat recliner of claim 4 wherein the first support bracket has a projection and the stop is a generally perpendicular surface edge abutting the reinforcement member.

8. The seat recliner of claim 7 wherein the projection is semi-pierced from the first support bracket.

9. The seat recliner of claim 4 further comprising a release mechanism including a release lever mounted on one of the first and second support brackets for rotating the cam out of engagement with the pawl and allowing the teeth of the pawl to disengage the teeth of the arm.

10. The seat recliner of claim 9 further comprising positive drive out means for disengaging the pawl teeth from the teeth of the arm when the release mechanism is actuated, comprising a hook portion of the cam which upon actuation of the release lever rotates into engagement with the pawl to force the pawl to rotate away from the arm.

11. The seat recliner of claim 4 further comprising a rivet extending from the arm and a pivot spring having a first end mounted on the pivot and a second end mounted on the rivet, biasing the arm toward a full up position.

12. The seat recliner of claim 4 wherein the reinforcement member is positioned principally in a first plane and at least a portion of the first support bracket near the pivot is positioned principally in a second plane substantially parallel the first plane.

13. The seat recliner of claim 12 wherein a projection of the reinforcement member extends from the first plane into the second plane, and the first support bracket has an opening sized to receive the projection.

14. The seat recliner of claim 12 wherein a projection of the first support bracket extends from the second plane into the first plane, and the stop is a surface edge of the reinforcement member generally perpendicular to the plane of the reinforcement member.

15. An inertia latch for a seat in a motor vehicle comprising, in combination:

first and second support brackets substantially co-planar and spaced from each other for mounting other componentry of the inertia latch;

a pivot connecting the first support bracket and non-adjustably rigidly fixed to the first support bracket to the second support bracket;

an arm pivotably mounted on the pivot for rotation over a travel range extending from a forward position to an adjustable rearward position, and having at least one toothed section;

a pawl mounted on the support brackets at a second pivot for pivotable movement between at least a front latching position and a non-latching position, being movable to the front latching position in response to a sudden change in velocity in a first direction of the motor vehicle, having at least a first toothed section for latching engagement with the at least one toothed section of the arm when the pawl is in the front latching position; and a reinforcement member enhancing deflection strength of the pivot against shear force on the pivot, non-rotationally fixed to the pivot and contacting the first support bracket at a stop located on the first support bracket and at a location remote from pivot when the arm is in the rearward position.

16. The inertia latch of claim 15 wherein the pawl is movable to a rear latching position in response to a sudden change in velocity in a second direction generally opposite the first direction, the arm having a second toothed section and the pawl having a second toothed section for latching engagement with the second toothed section of the arm when the pawl is in the rear latching position.

17. A seat for a motor vehicle having first and second sides comprising, in combination:

a seat base and a seat back which is pivotable relative the seat base;

a recliner assembly mounted on a first side of the seat, the recliner assembly comprising support bracket means fixedly attached to the seat base for mounting other componentry of the recliner assembly, a pivot non-adjustably rigidly fixed to the support bracket means, an arm attached to the seat back and pivotable around the pivot over a travel range, and means for releasably locking and releasing the arm from its adjustable rearward position for adjusting the seat back; and a reinforcement member attached to the pivot and being fixed in contact with the support bracket means at a stop positioned on the support bracket means at a location remote from the pivot, increasing the resistance of the pivot to shearing forces generated by loading on the seat back.

* * * * *